C. W. & W. W. Marsh,
Harvester Rake.
No. 2015. Reissued. June 27, 1865
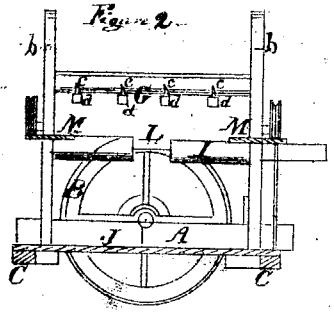
Witnesses
Samuel Marsh.
Albert Hinds
Inventors
C. W. Marsh
W. W. Marsh
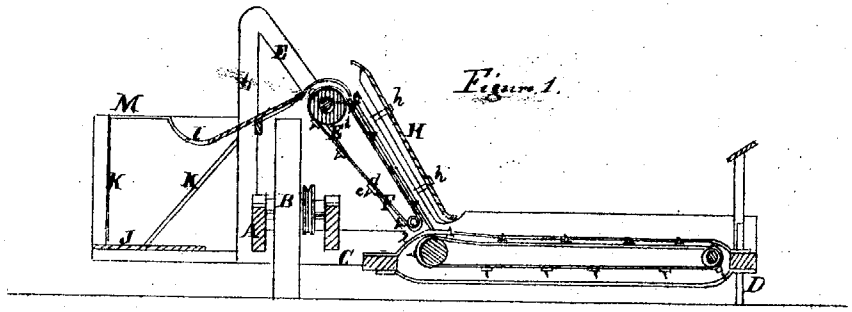
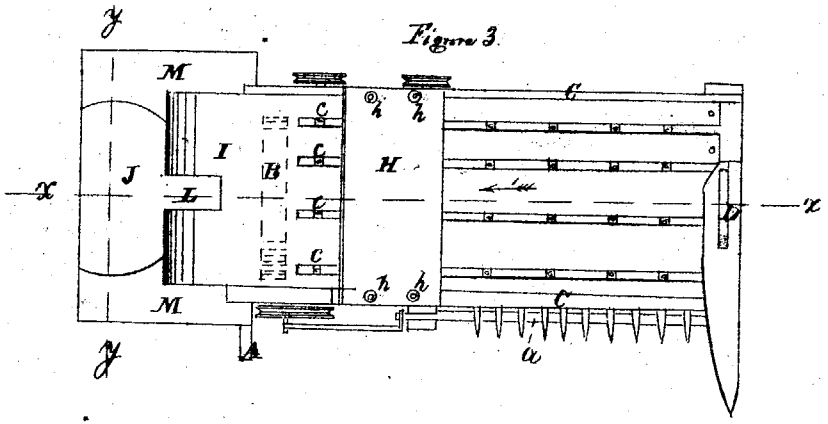

UNITED STATES PATENT OFFICE.

C. W. MARSH AND W. W. MARSH, OF CLINTON, ILLINOIS.

IMPROVEMENT IN REAPING-MACHINES.

Specification forming part of Letters Patent No. 21,207, dated August 17, 1858; Reissue No. 1,719, dated July 5, 1864; Reissue No. 2,015, dated June 27, 1865.

DIVISION NO. 2.

*To all whom it may concern:*

Be it known that we, C. W. MARSH and W. W. MARSH, of Clinton, in the county of De Kalb, in the State of Illinois, have invented a new and useful Improvement in Harvesters, which we have entitled a "Hand-Binding Attachment to Harvesters;" and we do declare that the following is a full, clear, and exact description of the same, reference being had to the annexed drawings, making a part of this specification, in which—

Figure 1 is a longitudinal vertical section of our invention, taken in the line *x x*, Fig. 3. Fig. 2 is a transverse vertical section of the same, taken in the line *y y*, Fig. 3. Fig. 3 is a plan or top view of the same.

Similar letters of reference indicate corresponding parts in the several figures.

This invention relates to an improved arrangement of parts applied to a reaping-machine or harvester for the purpose of enabling an attendant or attendants standing thereon to bind the cut grain (which is delivered to them as hereinafter described) with facility into sheaves.

To enable those skilled in the art to fully understand and construct our invention, we will proceed to describe it.

A represents the main frame of a harvester. B is the driving-wheel, and C is the platform-frame, within which are placed the drive-wheel B and grain-wheel D, at their proper places—viz., the grain-wheel at the left of the cutting apparatus, which may be the ordinary reciprocating sickle, *a*, placed in front of the frame C, operated in the ordinary manner from the drive-wheel B at the right, said platform-frame C being attached to the main frame A. Within the platform-frame C, behind the sickle *a*, may be placed an endless band of rakes or other self-raking device, which shall carry the cut grain in the direction indicated by the arrow 1, Fig. 3. To the inner side of said platform-frame C, at 2, Fig. 1, an inclined frame, E, is attached, supported at the upper end by uprights *b b*, Fig. 2, having an endless band of rakes, F, placed within it, which have the same inclination as the frame E. The grooved plate G, through the grooves of which the teeth *c* of the bars *d* of the band F project, terminates in a concave or grain-receptacle, I, the length of which may be about equal, or it may slightly exceed the width of the platform-frame C and frame E. The concave or grain-receptacle I projects over the side of the main frame A, and is partially supported by braces K from a platform, J. At each end of the concave or grain-receptacle I a table is placed, (see Fig. 3,) and attached to uprights *b b*, Fig. 2, and supported from platform J, or in an equivalent manner. These tables M M are the binders' tables, and are at a convenient height above the platform J for the manual operation of binding. The concave or grain-receptacle I is provided with an opening, L, through its bottom, extending to its outer edge. The platform J, which is the binders' platform, is placed at the right end of platform-frame C, longitudinally with drive-wheel B and grain-wheel D, as shown in Figs. 1 and 3.

The operation is as follows: As the harvester is drawn along the cut grain falling on the self-raking platform placed behind the sickle *a* (the ordinary reel being used) is conveyed to the endless band of rakes F, operated by any proper means, and by them is delivered in a continuous stream into the concave or grain-receptacle I. One or more attendants stand on platform J and bind the grain into sheaves, the grain being encompassed by the band in the concave or grain-receptacle I and removed therefrom and the bands twisted on the tables M M, from whence they are deposited on the ground. It will be seen that as the attendant binders stand on platform J, each has a table, M, at his end of the receptacle I. They therefore alternately encompass the sheaves and twist the bands, so that, although they do not occupy much room, they do not interfere with nor bother each other, and consequently the operation of binding is much facilitated by the relative position of those parts, as described above. Again, the concave or grain-receptacle I has an opening, L, through its bottom, and extending to its outer edge. This enables the attendant binder, when the sheaf is being encompassed, to pass his hand below the bed of the sheaf without obstruction or friction upon his hand aforesaid.

Having thus described our invention, we claim as new and desire to secure by Letters Patent—

1. The binders' tables M M, when used in connection with the concave I, or other equivalent grain-receptacle, substantially as and for the purpose set forth.

2. Binders' platform J, when used in connection with tables M M, substantially as and for the purpose specified.

3. The relative arrangement of the several parts of the binding attachment, as shown in Figs. 2 and 3, a table, M, at each end of the receptacle I and platform J, so that the binders stand between said tables, substantially as and for the purpose set forth.

In testimony whereof we, the said C. W. MARSH and W. W. MARSH, hereto subscribe our names, in the presence of the witnesses whose names are hereto subscribed, on the 22d day of November, 1864.

C. W. MARSH.
W. W. MARSH.

Witnesses:
SAMUEL MARSH,
ALBERT HINDS.